(12) United States Patent
Onozu et al.

(10) Patent No.: US 8,131,260 B2
(45) Date of Patent: Mar. 6, 2012

(54) MOBILE COMMUNICATION DEVICE, MOBILE COMMUNICATION DEVICE CONTROL PROGRAM, AND MOBILE COMMUNICATION DEVICE CONTROL METHOD

(75) Inventors: Takayuki Onozu, Kawasaki (JP); Masaharu Minowa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1138 days.

(21) Appl. No.: 11/447,252

(22) Filed: Jun. 6, 2006

(65) Prior Publication Data
US 2007/0189532 A1 Aug. 16, 2007

(30) Foreign Application Priority Data
Feb. 14, 2006 (JP) .................. 2006-036622

(51) Int. Cl.
*H04M 1/66* (2006.01)
*H04M 1/68* (2006.01)
*H04M 3/16* (2006.01)
*H04K 1/00* (2006.01)
*G06F 11/30* (2006.01)
*G06F 12/14* (2006.01)

(52) U.S. Cl. ........... 455/411; 380/247; 726/34; 713/189
(58) Field of Classification Search .................. 455/411; 713/189–194; 726/34; 380/247
See application file for complete search history.

(56) References Cited

U.S. PATENT DOCUMENTS

| | | | |
|---|---|---|---|
| 5,864,757 A * | 1/1999 | Parker ........................... | 455/418 |
| 6,321,079 B1 * | 11/2001 | Cooper ......................... | 455/411 |
| 6,550,010 B1 * | 4/2003 | Link et al. ..................... | 713/168 |
| 7,127,241 B2 * | 10/2006 | Castrogiovanni et al. ..... | 455/418 |
| 7,274,950 B2 * | 9/2007 | Castrogiovanni et al. ..... | 455/558 |
| 7,363,055 B2 * | 4/2008 | Castrogiovanni et al. ..... | 455/558 |
| 7,389,123 B2 * | 6/2008 | Rydgren et al. ........... | 455/550.1 |
| 7,536,173 B1 * | 5/2009 | Link et al. ..................... | 455/411 |
| 7,599,681 B2 * | 10/2009 | Link et al. ..................... | 455/411 |

(Continued)

FOREIGN PATENT DOCUMENTS

JP 61-52775 A 3/1986

(Continued)

OTHER PUBLICATIONS

Japanese Office Action dated Oct. 5, 2009, issued in corresponding Japanese Patent Application No. 2006-036622.

*Primary Examiner* — Christian LaForgia
(74) *Attorney, Agent, or Firm* — Fujitsu Patent Center

(57) ABSTRACT

There is provided a mobile communication device having a function capable of releasing lock on an IC card function by an authentication key other then a PIN if the IC card function is locked by a PIN authentication error in a mobile phone having a contactless IC card built in. When a PIN is locked in a mobile phone 1 having a contactless IC card built in, an IC application 11 is started up to transmit a second password other than a PIN to an authentication server 3. The authentication server 3 compares the second password received from the mobile phone 1 with another second password stored in a database 31. If both second passwords agree with each other, a PIN lock release command is transmitted to the mobile phone 1. Further, the mobile phone 1 switches the lock flag of the contactless IC card 13 to OFF from ON by the command received. The PIN lock of the IC card function is thereby released.

21 Claims, 4 Drawing Sheets

U.S. PATENT DOCUMENTS

| | | | |
|---|---|---|---|
| 7,613,456 B2* | 11/2009 | Chatterjee et al. | 455/435.1 |
| 7,784,088 B2* | 8/2010 | Darbha et al. | 726/4 |
| 7,860,487 B2* | 12/2010 | Cambois et al. | 455/411 |
| 7,886,355 B2* | 2/2011 | Rager et al. | 726/21 |
| 7,929,959 B2* | 4/2011 | De Atley et al. | 455/418 |
| 2003/0006280 A1* | 1/2003 | Seita et al. | 235/380 |
| 2003/0149662 A1* | 8/2003 | Shore | 705/39 |
| 2004/0042604 A1* | 3/2004 | Hiltunen et al. | 379/211.05 |
| 2004/0092248 A1* | 5/2004 | Kelkar et al. | 455/411 |
| 2005/0233733 A1* | 10/2005 | Roundtree et al. | 455/414.1 |
| 2006/0025110 A1* | 2/2006 | Liu | 455/411 |
| 2006/0085847 A1* | 4/2006 | Ikeuchi et al. | 726/6 |
| 2006/0179452 A1* | 8/2006 | Amodeo et al. | 725/25 |
| 2006/0183500 A1* | 8/2006 | Choi | 455/558 |
| 2006/0231623 A1* | 10/2006 | Brown et al. | 235/451 |
| 2006/0233374 A1* | 10/2006 | Adams et al. | 380/268 |
| 2006/0276172 A1* | 12/2006 | Rydgren et al. | 455/410 |
| 2007/0051808 A1* | 3/2007 | Adams et al. | 235/451 |
| 2007/0293200 A1* | 12/2007 | Roundtree et al. | 455/414.1 |
| 2008/0214241 A1* | 9/2008 | Hiltunen et al. | 455/558 |
| 2008/0220744 A1* | 9/2008 | Rydgren et al. | 455/411 |
| 2009/0124271 A1* | 5/2009 | Roundtree et al. | 455/466 |
| 2009/0266883 A1* | 10/2009 | Adams et al. | 235/380 |
| 2010/0237148 A1* | 9/2010 | Brown et al. | 235/435 |

FOREIGN PATENT DOCUMENTS

| | | |
|---|---|---|
| JP | 2-32465 A | 2/1990 |
| JP | 11-275215 A | 10/1999 |
| JP | 2002-133384 A | 5/2002 |
| JP | 2002-175281 A | 6/2002 |
| JP | 2003-157412 A | 5/2003 |
| JP | 2005-352538 A | 12/2005 |
| JP | 2005-352544 A | 12/2005 |

* cited by examiner

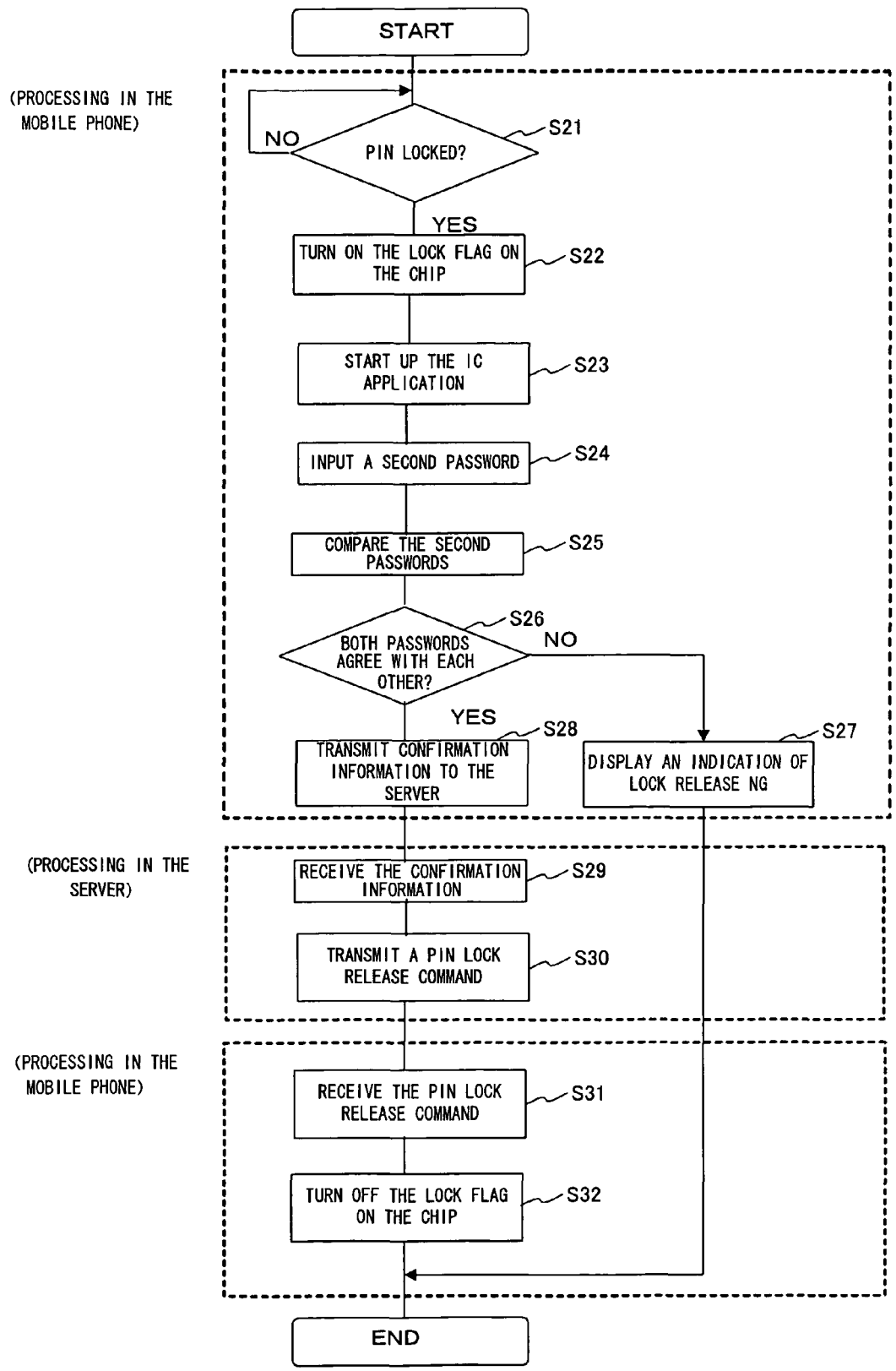

MOBILE COMMUNICATION DEVICE, MOBILE COMMUNICATION DEVICE CONTROL PROGRAM, AND MOBILE COMMUNICATION DEVICE CONTROL METHOD

BACKGROUND OF THE INVENTION

1. Field of the Invention

The present invention relates to a mobile communication device such as a mobile phone in which a contactless IC card is built, a mobile communication device control program, and a mobile communication device control method. In particular, the present invention relates to a mobile communication device having a function to release a lock on a password when a password for authorizing use is locked in case of using a contactless IC card, a mobile communication device control program, and a mobile communication device control method.

2. Description of the Related Art

There has been a conventional contactless IC card (hereinafter simply called an IC card in several cases) or a mobile phone in which a contactless IC card is built. There also have been cases that, for example, an expensive item is paid with a credit card using the IC card on shopping and that a personal computer (hereinafter called a PC) is logged in for business purpose. In these cases, if a password (PIN: Personal Identification Number) is entered incorrectly a particular number of times (for example, three times), the PIN is locked and use of the IC card is prohibited. That is, if a PIN authentication error is repeated, the IC card function is protected to maintain security.

Alternatively, if a PIN authentication error is unintentionally repeated by mistake by the user of a mobile phone and if the PIN is locked to protect the IC card function, the user of the mobile phone asks a system manager to release the lock, i.e., to release the protection.

There is disclosed a technique for releasing lock of a PIN by use of a mobile phone though disclosed is neither a contactless IC card nor a mobile phone having a built-in contactless IC card. This technique is now described as a reference. For example, in advance, a lock release code is set in a mobile phone from a subscriber identification module. In case of releasing lock, a random number is transmitted from the mobile phone to the subscriber identification module. As a result, the subscriber identification module calculates a lock release calculation value by use of the received random number and a lock release code and transmits the lock release calculation value to the mobile phone. On the other side, the mobile phone performs unlocking only when the received lock release calculation value agrees with a lock release calculation value which the mobile phone internally calculates (see, for example, Jpn. Pat. Appln. Laid-Open Publication No. 11-275215, paragraphs 0019 to 0037, and FIG. 1).

However, if lock release (release of protection) is carried out when the PIN of a contactless IC card built in a mobile phone is locked, the system manager releases the lock of the PIN after identifying the client of the lock release by a meeting or telephone call to identify whether the client is the actual user of the mobile phone or a malicious third party who is "masquerading". However, this method of confirmation requires a lot of labor and time of the system manager to release the lock of the PIN.

The technique according to the above publication No. 11-275215 requires human manipulation by an operator and so requires also a lot of labor and time of a system manager.

SUMMARY OF THE INVENTION

The present invention has been made to solve the problems described above, and has an object of providing a mobile communication device, a mobile communication device control program, and a mobile communication device control method, which have a function capable of releasing lock (or protection) of an IC card function online by using an authentication key other than a PIN normally used, without requiring labor and time of a system manager, if the IC card function is locked (or protected) by a PIN authentication error in a mobile phone having a built-in contactless IC card.

According to the present invention, there is provided a mobile communication device that is brought close to an information processing device to make wireless communication with the information processing device, comprising: a lock section that carries out lock of operation concerning use authentication if a user of the mobile communication device conducts wireless communication with the information processing device to carry out the use authentication and if the use authentication fails satisfying a predetermined lock condition; a user authentication information obtaining section that obtains user authentication information as information concerning authentication of the user if the lock is carried out by the lock section; a user management server wireless communication section that wirelessly transmits the user authentication information obtained by the user authentication information obtaining section to a user management server, and wirelessly receives an instruction from the user management server; and a lock release section that releases the lock if the instruction wirelessly received by the user management server wireless communication section is an instruction about release of the lock.

In the mobile communication device according to the present invention, preferably, the lock section uses a wireless communication function of a contactless IC card, and the information processing device uses a wireless communication function of a reader/writer of the contactless IC card.

In the mobile communication device according to the present invention, preferably, the user management server wireless communication section uses a wireless communication function in a mobile communication network.

In the mobile communication device according to the present invention, preferably, based on an input from the user, the user authentication information obtaining section obtains a second password different from a first password used for the use authentication, and regards the obtained second password as the user authentication information.

In the mobile communication device according to the present invention, preferably, the user authentication information obtaining section obtains biological information of the user, and regards information calculated from the obtained biological information as the user authentication information.

In the mobile communication device according to the present invention, preferably, the user management server compares the user authentication information transmitted from the user management server wireless communication section with other user authentication information registered in advance, thereby to authenticate the user, and transmits an instruction about release of the lock to the mobile communication device if the user is authenticated.

In the mobile communication device according to the present invention, preferably, based on an input from the user, the user authentication information obtaining section obtains a second password different from a first password used for the use authentication, compares the obtained second password with another second password registered in advance, thereby to authenticate the user, and if the user is authenticated, regards as the user authentication information the fact that the user has been authenticated.

In the mobile communication device according to the present invention, preferably, the user authentication information obtaining section obtains biological information of the user, compares the obtained biological information with other user biological information registered in advance, thereby to authenticate the user, and if the user is authenticated, regards as the user authentication information the fact that the user has been authenticated.

In the mobile communication device according to the present invention, preferably, the user management server receives the user authentication information from the user management server wireless communication section, and transmits an instruction about release of the lock to the mobile communication device if the user corresponding to the user authentication information satisfies a predetermined permission condition.

In the mobile communication device according to the present invention, preferably, the predetermined permission condition is that the user corresponding to the user authentication information is not a user who has been registered in advance and has been prohibited from release of lock.

In the mobile communication device according to the present invention, preferably, the predetermined lock condition is that the number of times the use authentication fails reaches a predetermined value.

Further, according to the present invention, there is provided a mobile communication device control program that makes a computer of a mobile communication device execute control of the mobile communication device that is brought close to an information processing device to make wireless communication with the information processing device, comprising: a lock step that carries out lock of operation concerning use authentication if a user of the mobile communication device conducts wireless communication with the information processing device to carry out the use authentication and if the use authentication fails satisfying a predetermined lock condition; a user authentication information obtaining step that obtains user authentication information as information concerning authentication of the user if the lock is carried out by the lock step; a user management server wireless communication step that wirelessly transmits the user authentication information obtained by the user authentication information obtaining step to a user management server, and wirelessly receives an instruction from the user management server; and a lock release step that releases the lock if the instruction wirelessly received by the user management server wireless communication step is an instruction about release of the lock.

Further, according to the present invention, there is provided a mobile communication device control method of controlling a mobile communication device that is brought close to an information processing device to make wireless communication with the information processing device, comprising: a lock step in the mobile communication device that carries out lock of operation concerning use authentication if a user of the mobile communication device conducts wireless communication with the information processing device to carry out the use authentication and if the use authentication fails satisfying a predetermined lock condition; a user authentication information obtaining step in the mobile communication device that obtains user authentication information as information concerning authentication of the user if the lock is carried out by the lock step; a user authentication information transmission step in the mobile communication device that wirelessly transmits the user authentication information obtained by the user authentication information obtaining step to a user management server; a mobile communication device instruction transmission step in the user management server that transmits an instruction to the mobile communication device, based on the information wirelessly transmitted by the user authentication information transmission step; a user management server wireless reception step in the mobile communication device that wirelessly receives the instruction wirelessly transmitted by the mobile communication device instruction transmission step; and a lock release step in the mobile communication device that releases the lock if an instruction about release of the lock is received by the user management server wireless reception step.

In the mobile communication device control method according to the present invention, preferably, the lock step uses a wireless communication function of a contactless IC card, and the information processing device uses a wireless communication function of a reader/writer of the contactless IC card.

In the mobile communication device control method according to the present invention, preferably, the user authentication information transmission step, the mobile communication device instruction transmission step, and the user management server wireless reception step use a wireless communication function in a mobile communication network.

In the mobile communication device control method according to the present invention, preferably, based on an input from the user, the user authentication information obtaining step obtains a second password different from a first password used for the use authentication, and regards the obtained second password as the user authentication information.

In the mobile communication device control method according to the present invention, preferably, the user authentication information obtaining step obtains biological information of the user, and regards information calculated from the obtained biological information, as the user authentication information.

In the mobile communication device control method according to the present invention, preferably, the mobile communication device instruction transmission step compares the user authentication information transmitted by the user authentication information transmission step with the user authentication information registered in advance, thereby to authenticate the user, and transmits an instruction about release of the lock to the mobile communication device if the user is authenticated.

In the mobile communication device control method according to the present invention, preferably, based on an input from the user, the user authentication information obtaining step obtains a second password different from a first password used for the use authentication, compares the obtained second password with another second password registered in advance, thereby to authenticate the user, and if the user is authenticated, regards as the user authentication information the fact that the user has been authenticated.

In the mobile communication device control method according to the present invention, preferably, the user authentication information obtaining step obtains biological information of the user, compares the obtained biological information with other user biological information registered in advance, thereby to authenticate the user, and if the user is authenticated, regards as the user authentication information the fact that the user has been authenticated.

According to the mobile communication device of the present invention, lock release of a PIN can be applied for via a network from an IC application which the mobile communication device has. In addition, dishonest lock release by "masquerading" can be prevented by use of a second password which only the user can know. Therefore, the system manager need not carry out user identification by conducting a meeting or a phone call. Release of PIN lock hence does not require time or labor of the system manager, so that real-time release of PIN lock can be achieved. Thus, the mobile communication device according to the present invention can exhibit immediacy and security of release of PIN lock together.

BRIEF DESCRIPTION OF THE DRAWINGS

FIG. 4 is a flowchart showing the flow of PIN lock release processing executed by the system of the PIN lock release function in the second embodiment shown in FIG. 3.

DETAILED DESCRIPTION OF THE PREFERRED EMBODIMENTS

Embodiments of a mobile communication device according to the present invention will now be described with reference to the drawings. Outline of the mobile communication device according to the present invention will be described first.

According to the mobile communication device of the present invention, when an IC card function of the mobile communication device, i.e., a mobile phone having a built-in contactless IC card is locked (or protected) by a PIN authentication error, the mobile phone starts up an application (IC application program) to release PIN lock and asks an authentication server to release lock via a network. Then, the authentication server asks the user to input a second password different from a PIN normally used (which is the first password) to identify the user. For example, the second password may be biological information such as a fingerprint, voiceprint, iris, vein, or the like. Further, if the user identification is passed OK, the authentication server releases the lock of the PIN for the mobile phone. Then, the mobile phone releases lock information recorded on a chip in the contactless IC card built in itself. As a result, the lock on the PIN of the contactless IC card is released.

A preferred embodiment of a mobile communication device according to the present invention will now be specifically described, exemplifying a mobile phone.

Embodiment 1

Figure 1:
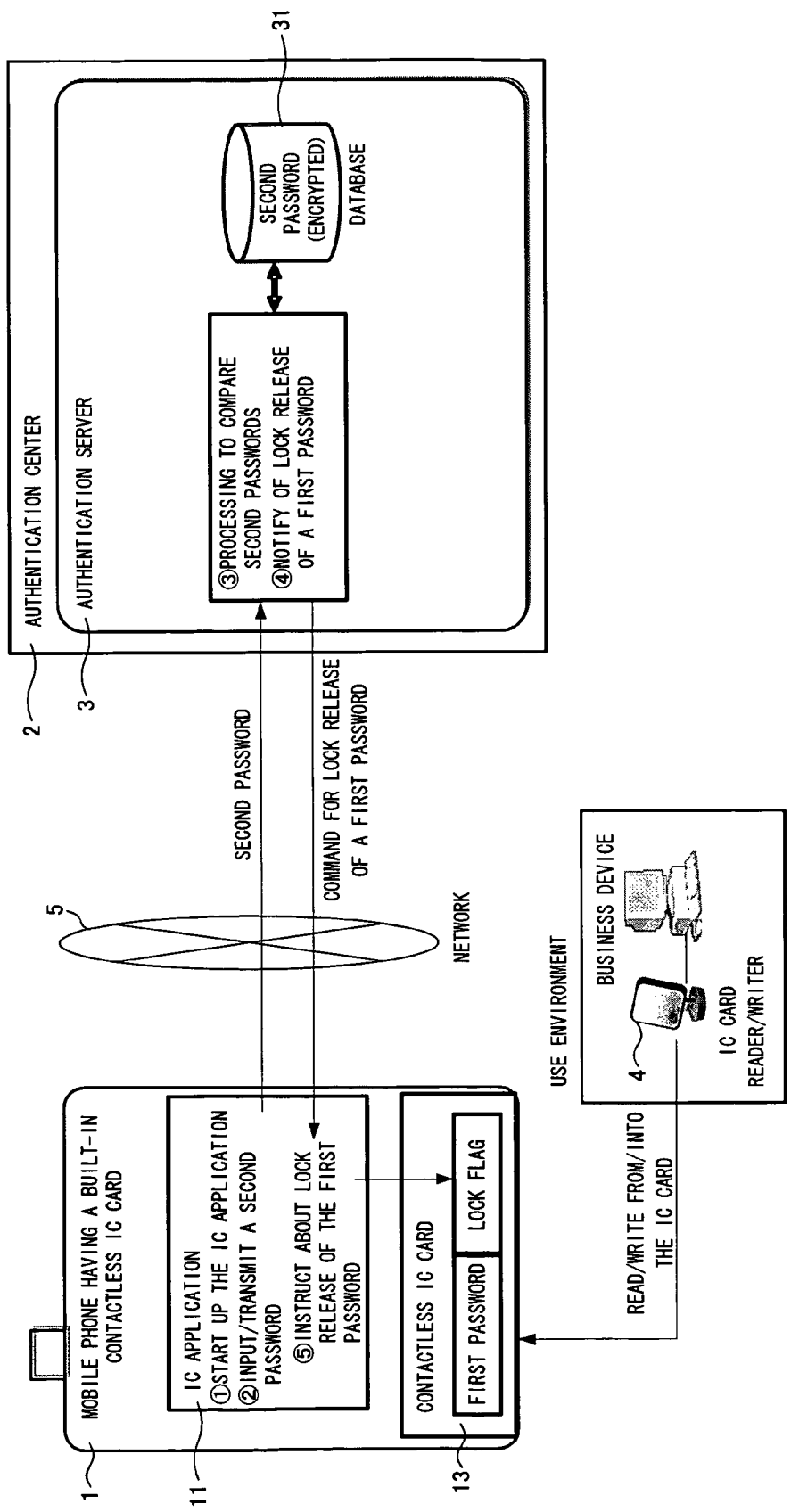
FIG. 1 is a conceptual diagram showing a PIN lock release function of a contactless IC card built in a mobile phone, which is applied to a first embodiment of the present invention.

FIG. 1 is a conceptual diagram showing a PIN lock release function of a contactless IC card built in a mobile phone, which is applied to the first embodiment of the present invention. This conceptual diagram shows componential elements to realize the PIN lock release function of the IC card and the flow of processing of PIN lock release.

The system of the PIN lock release function in the first embodiment shown in FIG. 1 is constituted by a mobile phone 1 having a built-in contactless IC card (which will be hereinafter simply called a mobile phone), an authentication server 3, and an IC card reader/writer 4. A contactless IC card used for use authentication of a business device is built in the mobile phone 1. The authentication server 3 is included in a authentication center 2. The IC card reader/writer 4 reads/writes information from/into the IC card without contact. The mobile phone 1 and the authentication server 3 are connected to a network 5. Note that the second password for user identification is managed by the authentication server 3.

The system configuration of the lock release function shown in FIG. 1 will now be described more specifically. The mobile phone 1 has an IC application 11 to realize the password lock release function, and a contactless IC card 13 to perform use authentication of external devices. Note that the contactless IC card 13 is located in a use environment in which the card 13 is capable of reading/writing information from/into its own IC chip by the IC card reader/writer 4 without contact.

The authentication server 3 included in the authentication center 2 is provided with a database 31. The database 31 encrypts and stores the second password which the owner of the mobile phone 1 has registered for user identification.

Figure 2:
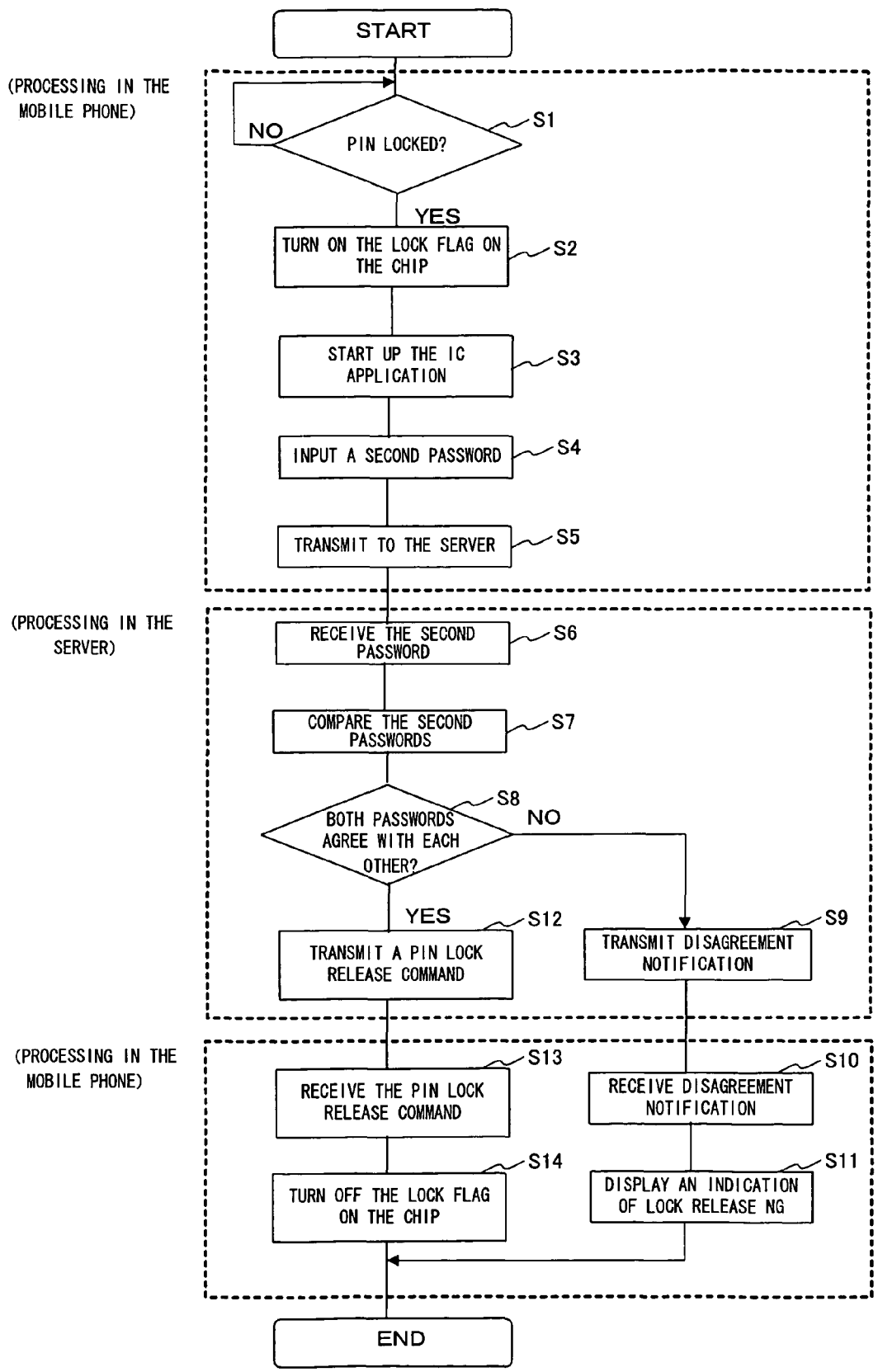
FIG. 2 is a flowchart showing the flow of PIN lock release processing executed by the system of the PIN lock release function in the first embodiment shown in FIG. 1.

FIG. 2 is a flowchart showing the flow of a PIN lock release processing which is executed by the system of the PIN lock release function in the first embodiment shown in FIG. 1. Operation of the PIN lock release processing according to the flowchart shown in FIG. 2 will now be described with reference to the system configuration shown in FIG. 1 and the processing flow.

The mobile phone 1 constantly monitors whether a PIN (first password) is locked or not (step S1). The first password is a secret number which is normally used to execute use authentication, for example, in a payment processing by a payment terminal using a credit card or in a log-in processing of a business PC.

If the first password (i.e., PIN) is incorrectly entered three times repeatedly, the PIN is locked (YES in step S1), and a lock flag on the IC chip of the contactless IC card 13 is turned ON (step S2). Next, the mobile phone 1 starts up the IC application 11 in accordance with a user's manipulation (step S3). The IC application 11 invites the user to input the second password. After the second password is inputted (step S4), the mobile phone 1 transmits the second password to the authentication server 3 (step S5).

Next, the authentication server 3 receives the second password from the mobile phone 1 (step S6), and compares the received second password with another encrypted second password stored in advance in the database 31 in the authentication server 3 itself (step S7). The authentication server 3 determines whether both of the second passwords agree with each other or not (step S8).

If both of the second passwords disagree with each other (NO in step S8), the authentication server 3 sends the mobile phone 1 a notification indicative of the disagreement between the second passwords (step S9). Further, the mobile phone 1 receives the disagreement notification of the second passwords (step S10), and displays an indication of impossible lock release (NG) of the PIN (step S11).

On the other side, if the authentication server 3 determines that the second password received from the mobile phone 1 and the other second password stored in the database 31 in the authentication server 3 agree with each other, as a determination result of step S8 (YES in step S8). The authentication server 3 transmits a command for PIN lock release to the mobile phone 1, to notify the mobile phone 1 that PIN lock release will be executed (step S12). To improve security, the command for PIN lock release may be transmitted together with an encryption key from the authentication server 3 to the mobile phone 1.

On the other side, the mobile phone 1 receives the command for PIN lock release (and an encryption key if necessary) from the authentication server 3 (step S13), and instructs the contactless IC card 13 to release PIN lock. Then, the contactless IC card 13 turns OFF the lock flag on the IC chip (step S14). As a result, the lock of the PIN (i.e., the first password) is released.

Embodiment 2

Figure 3:
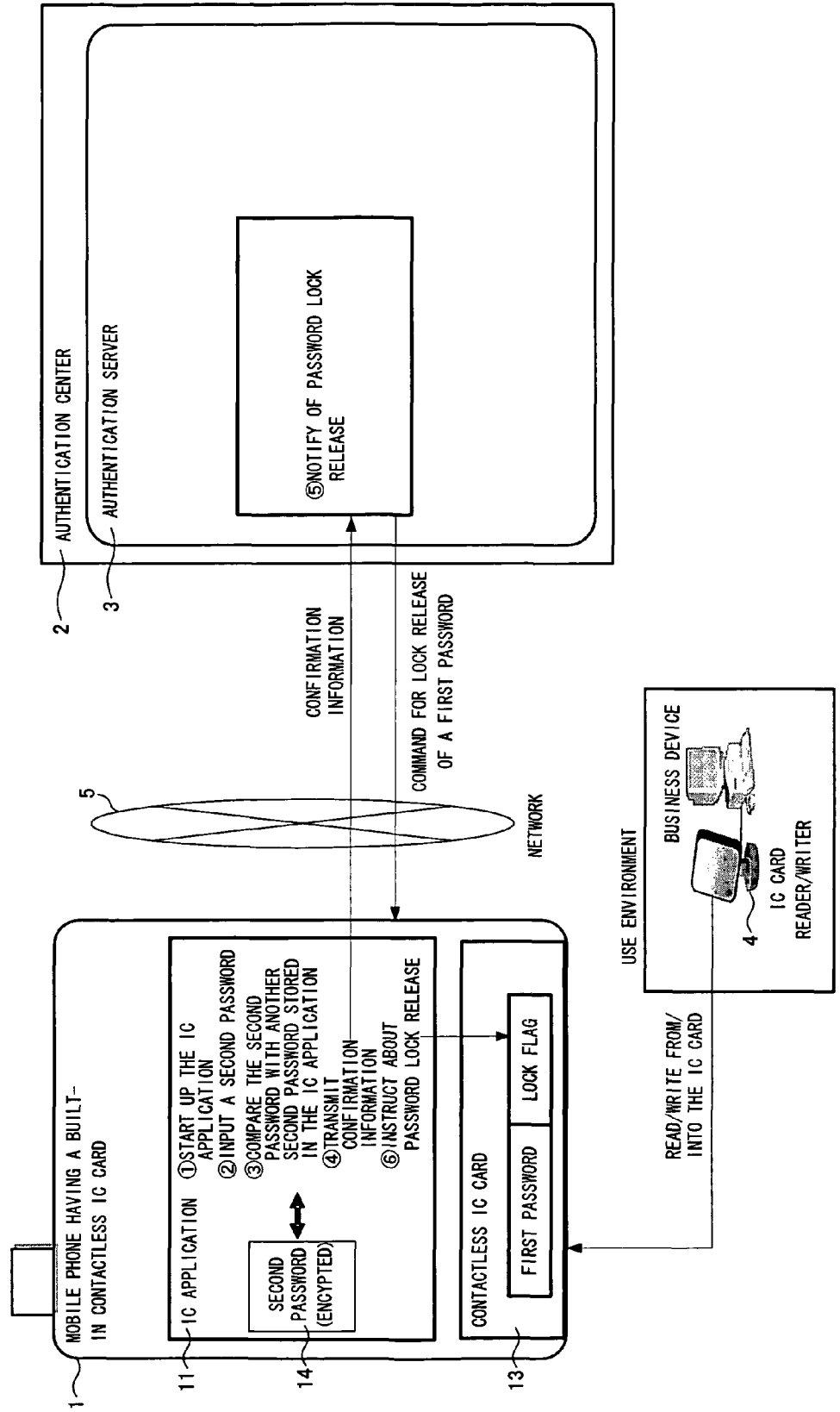
FIG. 3 is a conceptual diagram showing a PIN lock release function of a contactless IC card built in a mobile phone, which is applied to a second embodiment of the present invention.

Next, the system of a PIN lock release function and the flow of a lock release processing according to the second embodiment will be described. FIG. 3 is a conceptual diagram showing the PIN lock release function of a contactless IC card built in a mobile phone 1, which is applied to the second embodiment of the present invention. In the first embodiment shown in FIG. 1, the authentication server 3 manages the second password for user identification. However, in the second embodiment shown in FIG. 3, the mobile phone 1 manages the second password for user authentication.

Therefore, in the system of the PIN lock release function according to the second embodiment shown in FIG. 3, a second password 14 is encrypted and stored in the IC application 11 of the mobile phone 1 having a built-in contactless IC card (simply called a mobile phone), and the authentication server 3 has no database to store the second password. The other part of the system configuration is the same as that of the PIN lock release function according to the first embodiment shown in FIG. 1. This difference in system configuration causes a slight difference between the flow of the PIN lock release processing shown in FIG. 3 and the flow of the PIN lock release processing shown in FIG. 1. The flow of the PIN lock release processing shown in FIG. 3 will now be specifically described below along the flow of the flowchart. A reiterative description will be omitted with respect to the same componental elements in the system configuration of the second embodiment shown in FIG. 3 as those of the first embodiment.

FIG. 4 is a flowchart showing the flow of the PIN lock release processing executed by the system of the PIN lock release function according to the second embodiment shown in FIG. 3. Therefore, operation of the PIN lock release processing shown in the flowchart of FIG. 4 will be described with reference to the system configuration in FIG. 3.

The mobile phone 1 constantly monitors whether a PIN as a first password is locked or not (step S21). If the first password (i.e., PIN) is incorrectly entered three times repeatedly, the PIN is locked (YES in step S21), and a lock flag on the IC chip of the contactless IC card 13 is turned ON (step S22).

Next, the mobile phone 1 starts up the IC application 11 in accordance with a user's manipulation (step S23). The IC application 11 invites the user to input a second password. After the second password is inputted (step S24), the mobile phone 1 compares the inputted second password with another second password 14 stored in advance in the IC application 11 of the mobile phone 1 itself (step S25).

The mobile phone 1 then determines whether the second password just inputted and the other second password stored in advance in the IC application 11 of itself agree with each other (step S26). If both of the second passwords agree with each other (NO in step S26), the mobile phone 1 displays an indication of impossible lock release (NG) of the PIN (step S27).

Otherwise, if the inputted second password and the other second password 14 stored in advance in the IC application 11 of the mobile phone 1 itself as a determination result of step S26 (YES in step S26) agree with each other, the mobile phone 1 transmits confirmation information indicative of the agreement between both of the second passwords to the authentication server 3 (step S28).

The authentication server 3 receives the confirmation information (step S29), transmits a command for PIN lock release to the mobile phone 1, and notifies the mobile phone 1 of the PIN lock release (step S30). To improve security, the authentication server 3 may transmit the command together with an encryption key to the mobile phone 1.

Further, the mobile phone 1 receives the command for PIN lock release (and an encryption key if necessary) from the authentication server 3 (step S31), and instructs the contactless IC card 13 to turn OFF the lock flag on the IC chip (step S32). As a result, lock of the PIN (i.e., the first password) is released.

The above embodiments have been described with reference to a mobile phone as a preferred example. However, according to the present invention, the mobile communication device is not limited to the mobile phone as described in the above embodiments.

Further, a computer constituting a mobile communication device may provide a program to execute steps described above. If this kind of program is stored in a recording medium readable from computers, the program can be executed by the computer constituting the mobile communication device. The recording medium readable from computers may include an internal storage device built in a computer such as a ROM or RAM, a portable recording medium such as a CD-ROM, flexible disk, DVD disk, magneto-optical disk, or IC card, a database to store a computer program, another computer and a database thereof, or an online transmission medium.

Correspondence between componental elements of the present invention and the embodiments will be described next. The mobile communication device in the present invention corresponds to the mobile phone 1 having a built-in contactless IC card in the embodiments. The information processing device in the present invention corresponds to the IC card reader/writer 4 in the embodiments.

The lock section in the present invention corresponds to the contactless IC card 13 in the embodiments. The user management server wireless communication section in the present invention corresponds to the communication function of the mobile phone 1 in the embodiments. The user authentication information obtaining section in the present invention corresponds to the function realized by the IC application 11 in the embodiments. The user management server in the present invention corresponds to the authentication server 3 in the embodiments. Further, the lock release section in the present invention corresponds to the lock flag of the contactless IC card 13 in the embodiments.

What is claimed is:

1. A mobile communication device comprising:
a contactless IC card that stores information for authentication and a flag for a lock of the stored information, communicates with an information processing device by wireless communication via a reader/writer, authenticates first information received by the contactless IC card by the stored information, and carries out the lock of the stored information by setting the flag to ON when the authenticating of the first information is a failure and satisfies a predetermined lock condition;

a user authentication information obtaining section that monitors the contactless IC card, and obtains second information inputted into the mobile communication device by a user after the lock is carried out by the contactless IC card;

a user management server wireless communication section that transmits the second information to a user management server by wireless communication via a mobile communication network, and receives a command from the user management server by wireless communication via the mobile communication network when the command is transmitted from the user management server, wherein the user management server receives the second information from the mobile communication device, authenticates the second information by information registered with the user management server in advance, and transmits to the mobile communication device the command instructing release of the lock when the authenticating of the second information is a success; and a lock release section that releases the lock by setting the flag to OFF when the command is received from the user management server.

2. The mobile communication device according to claim 1, wherein the contactless IC card receives the first information transmitted from the information processing device by wireless communication via the reader/writer.

3. The mobile communication device according to claim 1, wherein the user authentication information obtaining section obtains a password inputted by the user as the second information.

4. The mobile communication device according to claim 1, wherein the user authentication information obtaining section obtains biological information of the user as the second information.

5. The mobile communication device according to claim 1, wherein the user management server receives the second information transmitted from the mobile communication device, compares the second information with the registered information, and transmits to the mobile communication device the command instructing the release of the lock when the second information agrees with the registered information.

6. The mobile communication device according to claim 1, wherein the predetermined lock condition is that the number of times the authenticating of the first information fails reaches a predetermined value.

7. A non-transitory computer-readable storage medium storing a program that makes a computer of a mobile communication device execute a process for control of the mobile communication device, the process comprising:

monitoring a contactless IC card included in the mobile communication device, the contactless IC card being configured to store information for authentication and a flag for a lock of the stored information, communicate with an information processing device by wireless communication via a reader/writer, authenticate first information received by the contactless IC card by the stored information, and carry out the lock of the stored information by setting the flag to ON when the authenticating of the first information is a failure and satisfies a predetermined lock condition;

obtaining second information inputted into the computer by a user after the lock is carried out by the contactless IC card;

transmitting the second information to a user management server by wireless communication via a mobile communication network, wherein the user management server receives the second information from the computer, authenticates the second information by information registered with the user management server in advance, and transmits to the computer a command instructing release of the lock when the authenticating of the second information is a success;

receiving the command from the user management server by wireless communication via the mobile communication network when the command is transmitted from the user management server; and releasing the lock by setting the flag to OFF when the command is received from the user management server.

8. A method of controlling a mobile communication device, comprising:

monitoring, using a computer of the mobile communication device, a contactless IC card included in the mobile communication device, the contactless IC card being configured to store information for authentication and a flag for a lock of the stored information, communicate with an information processing device by wireless communication via a reader/writer, authenticate first information received by the contactless IC card by the stored information, and carry out the lock of the stored information by setting the flag to ON when the authenticating of the first information is a failure and satisfies a predetermined lock condition;

obtaining, using the computer, second information inputted into the computer by a user after the lock is carried out by the contactless IC card;

transmitting, using the computer, the second information to a user management server by wireless communication via a mobile communication network using the computer;

receiving, using the user management server, the second information from the computer;

authenticating, using the user management server, the second information by information registered with the user management server in advance;

transmitting, using the user management server, to the computer a command instructing release of the lock when the authenticating of the second information is a success;

receiving, using the computer, the command from the user management server by wireless communication via the mobile communication network when the command is transmitted from the user management server; and releasing, using the computer, the lock by setting the flag to OFF when the command is received from the user management server.

9. The method according to claim 8, wherein the contactless IC card receives the first information transmitted from the information processing device by wireless communication via the reader/writer.

10. The method according to claim 8, wherein when the lock is carried out, the obtaining obtains a password inputted by the user as the second information.

11. The method according to claim 8, wherein the obtaining obtains biological information of the user as the second information.

12. The method according to claim 8, wherein the authenticating of the second information compares the second information with the registered information, and the transmitting of the command transmits to the computer the command instructing the release of the lock when the second information agrees with the registered information.

13. A mobile communication device comprising:
a contactless IC card that stores information for authentication and a flag for a lock of the stored information, communicates with an information processing device by wireless communication via a reader/writer, authenticates first information received by the contactless IC card by the stored information, and carries out the lock of the stored information by setting the flag to ON when the authenticating of the first information is a failure and satisfies a predetermined lock condition;
a user authentication information obtaining section that monitors the contactless IC card, obtains third information inputted into the mobile communication device by a user after the lock is carried out by the contactless IC card, and authenticates the third information by information registered with the mobile communication device in advance;
a user management server wireless communication section that transmits a result of the authenticating of the third information to a user management server by wireless communication via a mobile communication network, and receives a command from the user management server by wireless communication via the mobile communication network when the command is transmitted from the user management server, wherein the user management server receives the result from the mobile communication device, and transmits the command instructing release of the lock when the result indicates that the authenticating of the third information is a success; and
a lock release section that releases the lock by setting the flag to OFF when the command is received from the server.

14. The mobile communication device according to claim 13, wherein
the user authentication information obtaining section obtains a password inputted by the user and compares the inputted password with a password registered in advance, and when the inputted password agrees with the registered password, the user management server wireless communication section transmits to the user management server the result indicating that the authenticating of the third information is a success.

15. The mobile communication device according to claim 13, wherein the user authentication information obtaining section obtains biological information of the user and compares the obtained biological information with biological information registered in advance, and when the obtained biological information agrees with the registered biological information, the user management server wireless communication section transmits the result indicating that the authenticating of the third information is a success.

16. The mobile communication device according to claim 13, wherein when the user management server receives the third information from the mobile communication device, the user management server determines whether the third information satisfies a predetermined permission condition, and when the user management server determines that the third information satisfies the predetermined permission condition, the user management server transmits the command instructing the release of the lock to the mobile communication device.

17. The mobile communication device according to claim 16, wherein the predetermined permission condition is that the user corresponding to the third information is registered with the user management server in advance and is not prohibited from the release of the lock.

18. A non-transitory computer-readable storage medium storing a program that makes a computer of a mobile communication device execute a process for control of the mobile communication device, the process comprising:
monitoring a contactless IC card included in the mobile communication device, the contactless IC card being configured to store information for authentication and a flag for a lock of the stored information, communicate with an information processing device by wireless communication via a reader/writer, authenticate first information received by the contactless IC card by the stored information, and carry out the lock of the stored information by setting the flag to ON when the authenticating of the first information is a failure and satisfies a predetermined lock condition;
obtaining third information inputted into the computer by a user after the lock is carried out by the contactless IC card;
authenticating the third information by information registered with the computer in advance;
transmitting a result of the authenticating of the third information to a user management server by wireless communication via a mobile communication network, wherein the user management server receives the result from the computer, and transmits a command instructing release of the lock when the result indicates that the authenticating of the third information is a success;
receiving the command from the user management server by wireless communication via the mobile communication network when the command is transmitted from the user management server; and
releasing the lock by setting the flag to OFF when the command is received from the user management server.

19. A method of controlling a mobile communication device, comprising:
monitoring, using a computer of the mobile communication device, a contactless IC card included in the mobile communication device, the contactless IC card being configured to store information for authentication and a flag for a lock of the stored information, communicate with an information processing device by wireless communication via a reader/writer, authenticate first information received by the contactless IC card by the stored information, and carry out the lock of the stored information by setting the flag to ON when the authenticating of the first information is a failure and satisfies a predetermined lock condition;
obtaining, using the computer, third information inputted into the computer by a user after the lock is carried out by the contactless IC card;
authenticating, using the computer, the third information by information registered with the computer in advance;
transmitting, using the computer, a result of the authenticating of the third information to a user management server by wireless communication via a mobile communication network;
receiving, using the user management server, the result from the computer;
transmitting, using the user management server, to the computer a command instructing release of the lock when the result indicates that the authenticating of third information is a success;
receiving, using the computer, the command from the user management server by wireless communication via the mobile communication network when the command is transmitted from the user management server; and releasing, using the computer, the lock by setting the flag to OFF when the command is received from the user management server.

20. The method according to claim 19, wherein the obtaining obtains a password inputted by the user and compares the inputted password with a password registered in advance, and when the inputted password agrees with the registered password, the user management server wireless communication section transmits to the user management server the result indicating that the authenticating of the third information is a success.

21. The method according to claim 19, wherein the obtaining obtains biological information of the user and compares the obtained biological information with biological information registered in advance, and when, the transmitting of the result transmits the result indicating that the authenticating of the third information is a success.

* * * * *